Patented Feb. 12, 1935

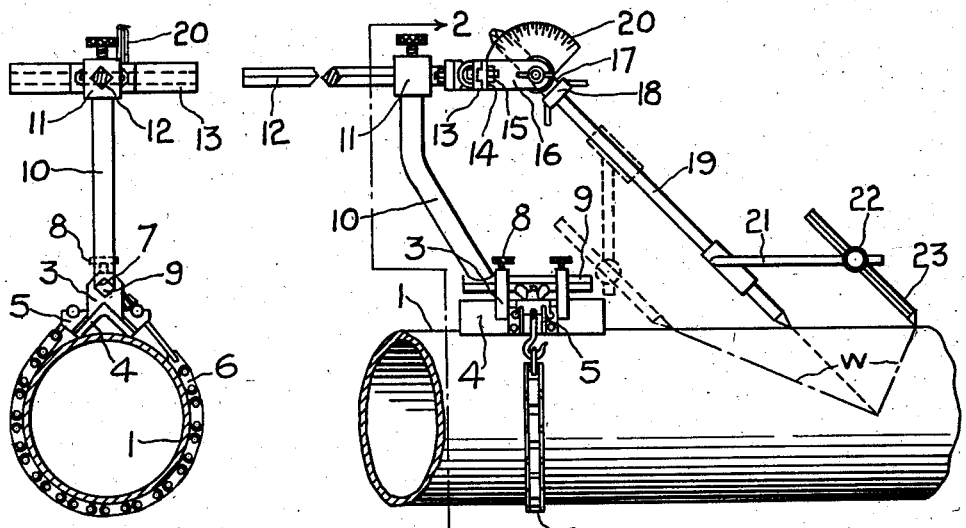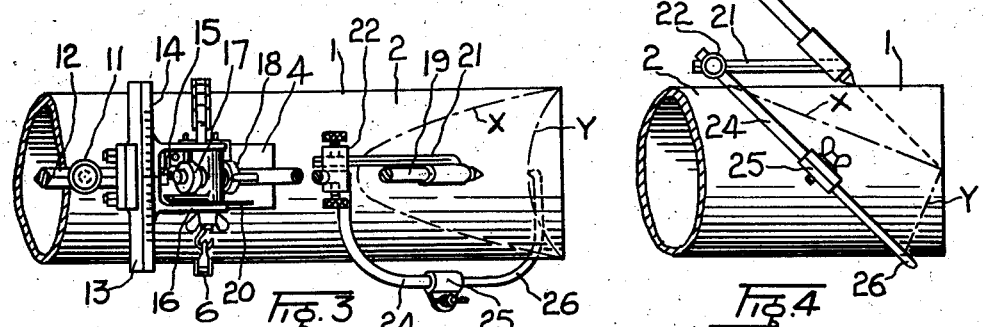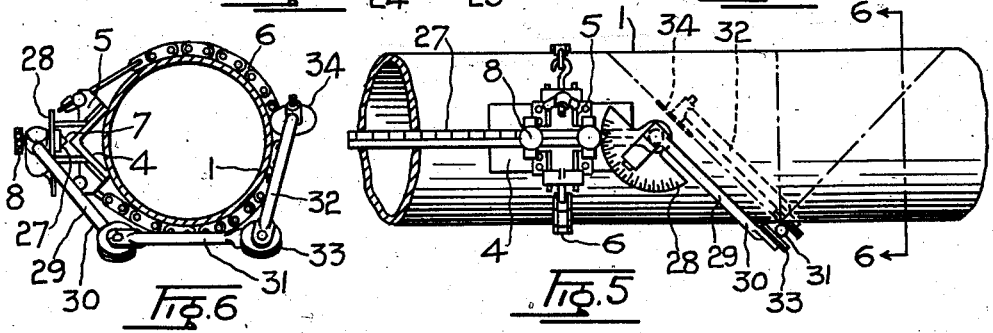

1,991,117

UNITED STATES PATENT OFFICE 1,991,117

MARKING OR SCRIBING DEVICE

Thomas Cossar Porteous and David James Henderson Taylor, Michel, British Columbia, Canada Application December 12, 1932, Serial No. 646,796

3 Claims. (Cl. 33—21)

Our invention relates to improvements in marking or scribing devices, the objects of the invention are to provide in a single instrument means whereby alternatively the intersection of one pipe or cylindrical object with another, or a pipe or cylindrical object with a surface which is flat or otherwise, may be accurately laid out, or whereby the line may be laid out on which to cut the end of a pipe or cylindrical object in order that it will fit the pipe or surface which it is intended to intersect. Further objects are to provide means whereby the intersecting marks may be drawn or scribed to conform to any desired angle of intersection of one pipe with another, or of one pipe and a plane or irregular surface. It is also an object of the invention to provide a device of such character as is readily portable and capable of convenient assembly and use in field work such as on pipe lines where intersections of branches with parent pipe lines have to be effected in trenches or in power plants remote from the factory, or where assembly is done by oxyacetylene cutting and welding, or otherwise.

The invention consists essentially of a support capable of attachment to or to be mounted upon a surface to be cut or intersected, and means adjustably carried by said support for marking or scribing contours of the cut of the intersecting members, or the member to be intersected, as will be more fully described in the following specification and shown in the accompanying drawing, in which:—

Fig. 1 is a longitudinal view of the invention arranged to mark the line of intersection on a pipe of a cylindrical member to be joined to it.

Fig. 2 is a transverse view of the invention taken on the line 2—2 of Figure 1.

Fig. 3 is a plan view showing the scribing arm arranged to mark off the line for cutting the end of an intersecting pipe.

Fig. 4 is a side view of the scribing arm attachment used for extending to the opposite side of a pipe from which the support is secured.

Fig. 5 is a plan view of the invention showing an attachment for traversing the entire periphery of the pipe to be cut.

Fig. 6 is an end elevation of the device taken on the line 6—6 of Figure 5.

In the drawing like characters of reference indicate corresponding parts in each figure.

The numeral 1, see Figures 1 and 2, indicates generally a pipe to which another pipe is to be connected, which will for the purpose of description be referred to as a parent pipe.

The numeral 2, see Figures 3 and 4, indicates generally a pipe which is to be marked and cut to intersect with the parent pipe, which will be referred to as a branch pipe.

The numeral 3 indicates a base block having its underside grooved longitudinally in the form of an inverted V as at 4, so that when mounted upon a pipe or cylindrical form the longitudinal axis of the base block will remain parallel to the longitudinal axis of the pipe. The base 3 is provided with side lugs 5 which are adapted to receive a chain and tightening medium 6 for the purpose of securing the base to the pipe 1. A groove 7 is formed on the upper side of the block for the purpose of supporting different parts of the device to be hereinafter described, and screw clips 8 are provided for securing any of said parts in aligned position with the base.

Fitted within the groove 7, as shown in Figures 1 and 2, is a base bar 9 from which a standard 10 arises and at the upper extremity of the latter a rectangular eye 11 is formed, which is arranged to support and secure a sliding bar 12. The sliding bar 12 is detachably fitted with a transverse guide 13 in which a graduated slide 14 is endwise movable, which slide is capable of being secured in any desired position by a nut 15 or other suitable means. A fork 16 is mounted upon the slide 14 in which a sleeve 17 is trunnioned upon an axis which is horizontal and is transverse to the sliding bar 12, this sleeve is preferably split at one end and fitted with a wing nut 18 for the purpose of contracting said sleeve about a pointer 19 which is adapted to be adjustably carried within the sleeve. A graduated protractor 20 is provided on the fork 16 for setting the pointer at the desired angle to the axis of the pipe.

The pointer 19 is a circular rod upon which an arm 21 is rotatably and slidably carried, this arm in turn is fitted with a screw block 22 of any suitable construction which is adapted to carry a scriber 23, preferably in parallel relation to the pointer, see Figures 1 and 2. The screw block 22 is also adapted to carry a cranked scriber arm 24 having a clip 25 at its lower extremity, which is adapted to carry a cranked scriber 26 capable of reaching the centre of the underside of the branch pipe 2 and marking said underside.

As an alternative attachment a graduated bar 27 is clipped within the groove 7 which is fitted with a horizontally disposed protractor head 28, swingably mounted about the axis of the protractor head is a jointed arm 29 preferably of three sections respectively indicated by the numerals 30, 31, and 32, these sections are connected together by plate hinges of appreciable surface as at 33 for the purpose of ensuring that the several sections will move constantly within a given plane. At the free end of the section 32 is a marking wheel or scribing tool 34 for the purpose of marking the line at which the pipe is to be cut.

In marking off a parent pipe which is to be cut into to accommodate a branch pipe of equal size wherein the angle of intersection is 45 degrees, the device is used as shown in Figures 1 and 2. The pointer 19 is set at the desired angle as indicated on the protractor 20, the scriber 23 is clamped to the arm 21 by the screw block 22 at a distance from the axis of the pointer equal to half the diameter of the intersecting branch pipe 2 and is then moved about the pointer in contact with the periphery of the parent pipe, which contacting movement is rendered possible by the rotating and sliding movements of the arm about the pointer, the mark thus made, as indicated by the dotted lines W, will conform to the contour at the intersection of the branch pipe meeting the parent pipe at an angle of 45 degrees.

If it is desired to fit a branch pipe that it may intersect a parent pipe to one side of the latter's longitudinal axis the graduated slide 14 is moved in the desired direction and to an appropriate distance along the transverse guide 13, thus offsetting the pointer as required and enabling a contour of appropriate dimension to be scribed therearound.

In marking off the end of a branch pipe to intersect at an angle of 45 degrees another pipe of similar size, the device is used as shown in Figures 1 and 2 to mark the upper side of the pipe according to the dotted line X of Figures 3 and 4, but the scriber 23 is removed and the cranked scriber arm 24 is fitted to the arm 21 and a cranked scriber 26 fitted to said arm and secured by the clip 25, this scriber extends below the longitudinal axis of the pipe 2 and in moving it about the lower periphery of the pipe and about the axis of the pointer 19 it describes the curve on the pipe which is represented by the dotted line Y. Obviously the movement of the scriber will be to encompass first one half of the underside of the pipe, when it will be necessary to swing it over the upper side of said pipe and thence downwards to scribe the second half of the line Y.

When it is desired to mark a pipe for cutting off an end at a desired angle, say 45 degrees, the device is used as shown in Figures 5 and 6 with the standard 10 removed and the bar 27 is substituted in the groove 7 of the base 3, the hingedly jointed arm 29 is set by its protractor to 45 degrees or whatever angle is required and the scribing or marking wheel 34 is run around first one half and then the second half of the pipe and in contact therewith.

It will be apparent that intersections or markings can be made to conform to any desired angle by suitably setting the instrument by its protractors, and also that adjustment as to the axis of the markings can be adjusted by the movement of the sliding bar 12 when about to mark the intersection of a branch to a parent pipe, or the movement of the rod bar 27 when marking for the cutting off of a pipe or an angle.

What we claim as our invention is:

1. An instrument for marking off the lines of intersection of one pipe and another, and of one pipe and a surface, comprising a base adapted for mounting on the pipe to be intersected, a bar carried by the base parallel to the axis of the pipe and having a transverse guide, a slide mounted to slide along said guide, a pointer carried by the slide, said pointer being swingingly mounted upon an axis parallel to said guide and means slidable longitudinally of and rotatable about the pointer for marking contours, said slide and pointer being adapted for movement to one side of the bar whereby the pointer may be directed to a pipe centre offset from the axis of the pipe upon which the base is mounted.

2. An instrument for marking off the lines of intersection of one pipe and another, and of one pipe and a surface, comprising a base adapted for mounting on the pipe to be intersected, a bar carried by the base parallel to the axis of the pipe and having a transverse guide, a slide mounted to slide along said guide, a pointer carried by the slide, said pointer being swingingly mounted upon an axis parallel to said guide, and means slidable longitudinally of and rotatable about the pointer for marking contours, a graduated scale for setting the angle of inclination of the pointer to the rod from which it is carried, and a graduated scale upon the transverse slide serving to indicate the distance the pointer is offset transversely, said slide and pointer being adapted for movement to one side of the bar whereby the pointer may be directed to a pipe centre offset from the axis of the pipe upon which the base is mounted.

3. An instrument for marking off the lines of intersection of one pipe and another comprising a base adapted for mounting on the pipe to be marked, a bar carried by the base parallel to the axis of the pipe, means for setting the rod to one side of the base while maintaining it in parallelism with the axis of the pipe, a pointer carried by the bar, said pointer being swingingly mounted upon an axis perpendicular to said bar, and means slidable longitudinally of and rotatable about the pointer for marking contours, said pointer being adapted when set to one side of the bar, to be directed to an intersecting pipe centre offset from the axis of the pipe upon which the base is mounted.

THOMAS COSSAR PORTEOUS.
DAVID JAMES HENDERSON TAYLOR.